UNITED STATES PATENT OFFICE 2,668,686

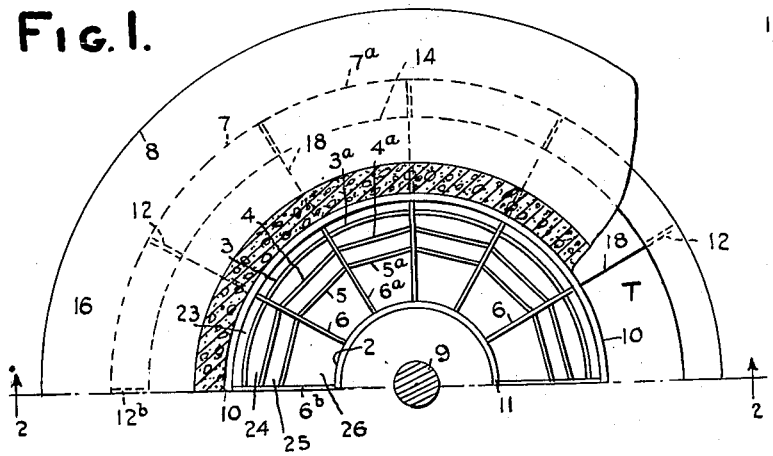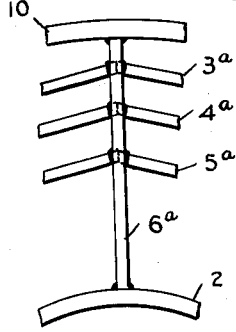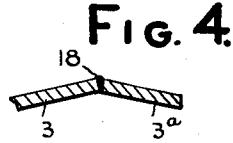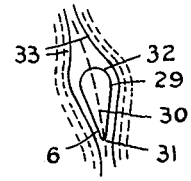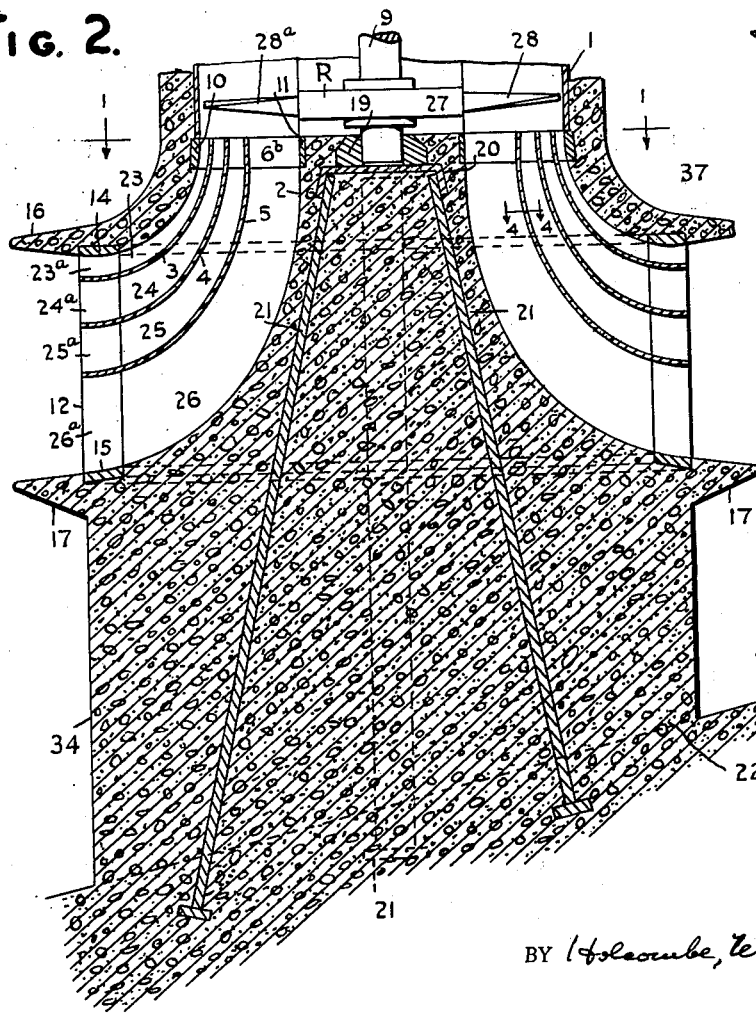
INVENTOR
Percy H. Thomas
HIS ATTORNEYS.

POLYGON CONE DRAFT TUBE

Percy H. Thomas, Washington, D. C.

Application February 10, 1949, Serial No. 75,680

5 Claims. (Cl. 253—117)

My invention relates to water turbines, and especially to the draft tubes utilized therewith to recover the kinetic energy in the water stream as it leaves the runner of the turbine. This device is well known in the art and no description of its general functioning or conventional forms is necessary. My draft tube is designed for increased efficiency and to reduce cost as well as to permit a smaller and more compact setting for the turbine.

My invention, on account of its extraordinary high efficiency, permits the use of higher than usual stream velocities at the discharge of the runner. The high efficiency of my draft tube is particularly valuable with low head plants.

The central purpose of my draft tube is to provide a construction which permits the maximum degree of gradual retardation of the water stream within the minimum distance, at the same time avoiding eddy losses. It is well understood that kinetic energy of a stream of moving fluid may be converted into static pressure by causing the cross-section of the stream to increase gradually when proceeding against a back pressure. When the velocity is thus reduced by a certain factor, the cross-section of the stream will be found to have increased by the same factor. The cross-section increase is thus a measure of the reduction in velocity. The magnitude of the reduction of the kinetic energy varies as the square of the same factor.

The well-known Moody draft tube employs one construction effective in extracting the kinetic energy from the discharge stream of a turbine. A bell-shaped structure with a core is utilized with the water entering at the small end at the top. The stream proceeds downward and outward forming a shell of water increasing in diameter as it proceeds. Such a tube is very efficient in decelerating the water without undue eddy losses.

It may be pointed out also, as an accepted tenet in water flow, that water in thin sheets may be deflected in direction by smoothly curved deflectors or guides without loss other than skin friction. Advantage is taken of this principle in many instances in turbine design.

In addition to the increase of the cross-section of a stream of water by causing expansion in a bell-shaped sheet or shell, expansion may be secured as in the discharge portion of a venturi meter, where the stream flowing against a back pressure moves in a closed channel having tapering sides. This causes a gradual increase in the transverse dimension of the channel. This method is efficient if the surface friction is low and the taper of the sides is not over a certain limit, generally taken as from 5 to 20%, taking the taper on both sides together.

In the present invention the stream of water is divided as it leaves the runner in the form of an annulus, into a nest of similar concentric shells by a plurality of concentric deflectors, which at the same time lead the water into spreading radial flow, while at the same time increasing the thickness of the shells, through a gradual taper provided between adjacent deflectors. This subdivision of the water column into component shells of slight thickness is very advantageous in securing a large percentage increase in the thickness of the stream in a minimum length of water path, due to the taper.

With this statement of the principles within which the designer may work, my invention will be described in connection with the drawings. Figure 1 is a part cross-section and part plan view of my draft tube, which is symmetrical about the axis, the cross-section being taken on the line 1—1 in Figure 2. Figure 2 is a side elevation, partly in vertical section on the line 2—2 in Figure 1, of a turbine runner and draft tube including elements of the turbine setting. Figure 3 shows in plan a detail, indicating the method by which certain elements of the draft tube are welded together, and Figure 4 shows in cross-section another welding detail, the section being taken through a joint about on the line 4—4 in Figure 2. Figure 5 is a diagram illustrating a special form of radial support plate.

In Figure 1, the reference character 1 is the outside casing of the turbine T, at the level of the rotor R. As this turbine is shown with a propeller type rotor as a matter of illustration, the water passage section is shown in the form of an annulus, 2 being the inner wall of the passage, at this point constituting a part of the runner R. The various members of the draft tube are made largely of steel plate or of other metal. The form of most of these members is shown in Figure 2.

The annulus passage between casings 1 and 2 extends down into the draft tube D, where it expands downward and outward roughly in a bell shape, so that the water when leaving the annulus moves substantially horizontally in all directions. This bell shaped annulus passage is divided into a series of subdivisions by a nest of bell shaped shells or deflectors. These shells are polygonal in plan or horizontal section, as shown in Figures 1 and 4, where 3 and 3a are adjacent side pieces of the outer polygonal shell; 4 and 4a, two side pieces of another shell; and 5 and 5a, of still another. In this draft tube I have shown three dividing shells, forming four component bell shaped passages. I may provide more or fewer, as the design may require.

These shells are held in position by radial plate support members at the top, each extending from the casing 1 to the casing 2. Three such radial support members are shown at 6, 6a, and 6b. These members, which may be of plate steel, are preferably welded to two horizontal ring plates, 10 and 11, embedded in the concrete walls surrounding the annulus, the latter forming parts of the casings 1 and 2, lining the annulus. Similarly the lower ends of the side pieces of the polygonal shells are held by other support plates, as at 12, welded to ring plates 14 and 15, embedded in the concrete at the exit of the draft tube D. These support plates are vertical and are preferably welded to the polygon side pieces. They may carry heavy stresses and are given adequate strength.

The shaft of the turbine T is shown at 9 and the lower edges of the polygon side pieces are shown at 7 and 7a, Figure 1. At the discharge opening of the draft tube proper, I provide guide lips 16 and 17 to control the thickness of the stream as a whole for a short distance after leaving the draft tube exit. The discharge velocity of the water stream will be still further reduced in passing these lips. The outer edge of the lip 16 is seen at 8, Figure 1, the actual lip extending in a complete circle.

Each polygon side member is separately fabricated. The upper horizontal edge is shorter than the lower, and the plate is given a curvature prescribed to obtain a suitable distribution of the pressure arising from the deflection of the water stream.

These side members may be assembled on the turbine site, and are welded to the support plate members. They are so shaped that when placed in position in the draft tube, the edges of the adjacent members meet for the whole length of the plates, so that they may be welded in position. Both ends of the side pieces are notched on the sides to fit the support plates as shown in Figure 3. The whole structure is finally welded into one unitary structure.

The fact that the side pieces of the polygon may be given the necessary curvature for deflecting the several component bells of the water stream by passing the plates through a set of bending rolls, requiring no heavy presses, is a great advantage, as is also the ease with which the draft tube may be assembled on the ground. In Figure 1 the side members 3 and 3a are shown with a certain convex curvature, while the plates of the other shells are flat. This curvature is to provide extra stiffness against bending in these particular plates, as they are subjected to a very heavy stress in deflecting the rapidly moving stream of water. This bellying curvature may be obtained by using curved bending rolls of varying diameter, hollow on one side of the side piece, convex on the other.

In Figure 2 the steady bearing is shown at the foot of the vertical shaft, at 19. This steady bearing 19 is fast on a cap member 20, which, in turn, is supported upon four strut members 21, 21. One of the strut members 21 is not seen as this view is a central section. As the detail of this cap member and its support is not a part of this invention, it is not further described.

It is suggested in erecting the cap member 20 that it be mounted on the struts 21, 21, previously mounted on the base 22, so that the support plates 6 and 12, and the ring plates 10, 11, 14, 15 be mounted in position, making appropriate use of the central cap support struts. The side plates forming the bell shaped shells may then be placed and welded in position. When this has been completed, concrete may be poured within the inner shell plates 2 and the bearing 19 set. The outer bell plates 1 may then be covered on the top with concrete, either by gunniting or otherwise and made a part of the concrete turbine setting.

The pedestal 34, connecting the base 22 with the concrete poured into the casing 2, and the back wall of the closed space upstream of the draft tube 35 indicate one general arrangement for the turbine setting. This however is not part of this invention and has not been shown in detail. The water discharged upstream from the draft tube may find its way to the tailrace through the passages indicated at 36 and 37, above and below the outlet of the tube between the lips 16 and 17.

The outline of a suitable rotor is shown at R, Figure 2, two blades being indicated at 28 and 28a. The rotor is not shown in Figure 1. The rotor hub, or portion within the annulus, around the shaft is indicated as 27. As the particular configuration of the rotor is not essential, it is not further illustrated.

This may be a high speed, impact type of turbine without guide vanes in which the water column passes directly through the rotor without rotation or swirl, the power being delivered by the static head on the blades, which are given a certain pitch, or it may be one of the conventional type, relying in operation on recovering kinetic energy from an artificially established swirl in the usual manner.

In Figure 3 is shown more in detail the assembly and welding of the side pieces to the plate support members, as 6, 6a, 6b. Figure 4 shows the welded point 18 between adjacent side pieces along the meeting edges between the ends.

In case of the existence of a certain amount of rotary motion or swirl in the water stream leaving the rotor, I may shape the radial support plates 6, 6a, 6b as shown in Figure 5, that is, in the form of an airfoil. Such an airfoil, as is well known, is adapted to deflect or bend a streamline sheet of fluid without material loss or reduction of velocity, and this even when the angle of attack varies over a considerable angular range. Such deflection permits the rectification of the swirl assumed in the water stream, and over a certain range of variation.

As shown in Figure 5, the support plate 6, in the form of an airfoil, has the cross-section shown at 29, the median line 30, indicating the path of the bending of the stream of water. The upper and lower outlines of the section are preferably equally spaced on both sides of the median line. The sharp edge of the trailing edge is shown at 31. The nose, in the form of a circular arc, is seen at 32, and the lines of flow of the water about the airfoil, at 33. The circular form of this nose permits a certain amount of variation in the angle of approach of the water column without turbulence, on account of the suction produced by the curvature of the path of the water behind the airfoil. The side pieces of the polygon may be fitted to these airfoil-like members as in the case of the corresponding members shown in Figure 3.

The constructural form of my invention having been described certain requirements are laid down for the designer. The radial width of the top of the draft tube matching the discharge opening of the turbine having been determined, this width is divided into a number of unequal parts or shells, the outer being progressively narrower than the others. Four component passages are shown in Figure 1.

The ratio of the entrance velocity of the water to the exit velocity must be the same in all the component passages. It must be noted that the overall decrease in velocity through the draft tube is due to independent effects, namely the difference in radii of the entrance and exit openings between the component passages, 23, 24, 25, 26, Figure 2, where 23a, 24a, 25a, 26a are the individual component passage exit openings; and secondly the taper or gradual increase in the thickness or width of the component passages from the entrance to the exit. Since the radii, that is the distances to the axis of the draft tube, are pretty well fixed by the construction, and since the increase in taper is limited by losses, it is desirable that the width of the several parts into which the entrance annulus is divided be so chosen that the greatest allowable taper may be used in all component passages. The highest permissible taper is desirable as it permits the use of the shortest passages and reduces the overall size of the draft tube. It should be noted that a given taper with a given length of passage will produce a percentage increase in passage cross-section in direct proportion to the opening width. Thus the increase in width due to taper will be a greater proportion of the width of a narrow passage than of a wide one.

The deflection of the fast moving water column by the draft tube produces very heavy stresses on the bell shaped shells, tending to press them down and to compress them inward. These forces depend numerically principally on the velocity of the water, but partly also on the sharpness of the curvature of the shells. Therefore the overall stresses are minimised by utilizing low curvatures where the water velocity is high and sharper curvatures where the velocity is low, as near the passage exits at 23a, 24a, 25a, 26a.

The several elements—the length of each component passage, the curvature of each of the side pieces, the variation of the taper distance between them and the width of the entrance opening along the radius—must be so adjusted that the ratio of the entrance end of the passage 23, for example, to the area of the exit end 23a shall be the same as the ratios of areas of the two ends of the other passages. In this case the whole cross-section of the water stream will issue from the draft tube at the same velocity, insuring minimum losses. This statement is based upon the assumption that the rotor of the turbine is so designed as to deliver water over the whole discharge annulus at the same velocity. If however this rotor be so designed as to deliver water at different radii at different velocities, it becomes necessary to make corresponding modifications in some of the above factors. In this adjustment it is necessary to take appropriate account of the skin friction on the walls of the passages and the hydraulic radius. Small variations in the rate of curvature of the side pieces are permissable for adjusting their curvature.

It is helpful to notice that the dimension of the exit opening of the draft tube measured in the horizontal plane is determined by the distance of the opening from the axis, while the dimension measured in the vertical plane is determined by the spacing and curvature of the bounding side pieces, the area of the opening being the product of the two.

The operation of this draft tube may be described as follows: When the water column leaves the rotor it will be moving either in an axial direaction or in a rough approximation thereto. As the stream proceeds, it finds itself automatically divided into a series of sub-annuli, as shown at 23, 24, 25, 26. After entering one of the passages, each sub-annulus of water must pass along under the influence of its impressed head and its kinetic energy. Since the water is being decelerated in this passage on account of the back pressure from the tail-race, it will completely fill the passage at all points in a well designed draft tube, and this in spite of the deflection of the course of the water stream and its tendency to "jet." The amount of this deceleration will depend upon the total increase in the area of the exit in proportion to that of the entrance. This same action occurs all around the circular draft tube. For a certain distance beyond the support plate 12, after leaving the exit, the cross-section of the water stream, now rejoined from the several sub-streams, is controlled by the lips 16 and 17, which have a total taper including both sides, of perhaps from 10% to 20%. The water continues to slow down with the recovery of additional energy. Once free of the lips, the water will find its way to the tail race, the portion moving upstream from the draft tube passing through the spaces 36 and 37, Figure 2. As these escape spaces have a greater area than that portion of the draft tube exit, and as all the water leaves the draft tube at the same velocity, a still further retardation of velocity will occur, and a further saving in kinetic energy.

It may be added that while in Figures 1 and 2, three dividing shells have been shown, any other number may be used. Similarly while a twelve sided polygon is illustrated, any regular polygon will serve. In spite of the multiple shells and the support members, the total wetted area will be far less than with the usual types of draft tubes, if made efficient, since very short water pasages may be used with their very narrow widths.

In the draft tube shown an area ratio between the entrance and the exit openings as great as 5 to 1 may be easily obtained, even with a turbine of 50,000 kw. capacity. This represents a recovery of 96% of the energy in the water column, less friction losses. Since this kinetic energy depends only on the velocity of the water stream, this high efficiency of the draft tube is very helpful, since for a given diameter of rotor for an impact type wheel the output is proportional to the stream axial velocity, so that an efficient draft tube permits higher stream velocity and greater output. The great gain in overall dimensions by the use of the polygon cone draft tube is obvious; also, the structural advantage of the symmetrical polygonal form in giving great rigidity against deformation where very heavy stresses are to be withstood. The ease of transportation and the opportunity to assemble on the spot are other advantages. Where erosion of the edges of the support pieces and side pieces occurs, repairs may often be made by welding in replacements, or by building up hollow places by welding.

I claim as my invention:

1. In a water wheel system in which the discharge of the wheel is spread through a plurality of concentric water shells, expanding all the way to the tail race, and emerging along all radii with a predominantly horizontal direction, the combination of a water wheel, including an enlarged hub and a plurality of blades, a surrounding casing, said hub and casing coacting to form an annular water passage, a shaft carrying said wheel and having a bearing below said wheel, a load bearing pedestal concentric with and carrying said bearing and registering at the top with said hub and said casing, a concrete setting for said wheel having an overhanging portion concentric with and surrounding said pedestal, the positions and surfaces of said pedestal and said overhanging portion forming a generally bell shaped water passage between them, gradually and continuously expanding from its entrance to its exit, a plurality of concentric deflectors located therein, dividing it into subpassages, said deflectors being built up from a plurality of side elements, each consisting of a four sided metal plate, narrow at the entrance end, wide at the exit end, and smoothly curved through its length, concave upward, the width and distribution of the side elements proportioned to cause the adjacent plate edges to meet at an angle along a curved line, said plates of each deflector being firmly fastened together along said line, to form a rigid polygonal ring belt surface surrounding said pedestal, the subdivided passages being proportioned according to the following rule; the thickness of each water passage expands regularly from entrance to exit, maintaining a constant angle with the median line and each side to secure efficient retardation of the water; said water subpassages having the same ratio of outlet to inlet area for all subpassages to secure equal water velocities at the exits; and the curvatures and spacings of the opposed surfaces of the pedestal and the overhanging portion of the setting are shaped to conform to the above rule applied to the subpassages and deflectors, the later being rendered rigid by streamline supporting spacers, extending between and secured to the deflectors and in the pedestal and the overhanging portion at the entrance and exit ends thereof, said spacers at the entrance end being horizontal and those at the exit end being vertical.

2. The combination of claim 1, with the limitation that the opposed surfaces of the pedestal and the overhanging portion of the setting are lined with sheet metal bonded to the deflectors by the supporting spacers into a unitary structure.

3. The combination of claim 1, with the limitation that the deflectors extend only from the entrance through the curved portion of the main passage, conserving wetted surface.

4. The combination of claim 1, with the limitation that the side members of at least one of the deflectors are arched, adding rigidity.

5. The combination of claim 1, with the limitation that there are at least twelve sides to the deflectors, adding to rigidity and efficiency.

PERCY H. THOMAS.

References Cited in the file of this patent

UNITED STATES PATENTS

| Number | Name | Date |
| --- | --- | --- |
| 1,223,841 | White | Apr. 24, 1917 |
| 1,467,168 | Kaplan | Sept. 4, 1923 |
| 1,515,211 | Kaplan | Nov. 11, 1924 |
| 1,519,173 | Taylor | Dec. 16, 1924 |
| 1,583,415 | Moody | May 4, 1926 |
| 1,681,706 | Moody | Aug. 21, 1928 |
| 2,131,611 | Biggs | Sept. 27, 1938 |
| 2,191,341 | Curley | Feb. 20, 1940 |
| 2,319,884 | Robbins | May 25, 1943 |
| 2,524,390 | Lau Bach | Oct. 3, 1950 |